US006627841B2

(12) United States Patent
Chen et al.

(10) Patent No.: US 6,627,841 B2
(45) Date of Patent: Sep. 30, 2003

(54) METHOD FOR DESIGNING A WELD FIXTURE BASED ON PREDICTED STRESSES AND DISTORTIONS

(75) Inventors: Xiao Chen, Peoria, IL (US); Yi Dong, Peoria, IL (US); Edward T. Martin, Decatur, IL (US); Zhishang Yang, Dunlap, IL (US); Wayne Tanner, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 9 days.

(21) Appl. No.: 09/851,853

(22) Filed: May 9, 2001

(65) Prior Publication Data

US 2002/0134816 A1 Sep. 26, 2002

Related U.S. Application Data

(60) Provisional application No. 60/278,824, filed on Mar. 26, 2001.

(51) Int. Cl.$^7$ .............. B23K 9/10; B23K 11/26; H05B 3/03; G06F 17/50
(52) U.S. Cl. .............. 219/110; 219/109; 219/119; 703/1; 703/2; 703/6
(58) Field of Search ................. 228/102–104; 219/109, 110, 119, 114, 117.1, 617; 703/1–6

(56) References Cited

U.S. PATENT DOCUMENTS

| | | | | |
|---|---|---|---|---|
| 4,596,917 A | * | 6/1986 | Nied et al. | 219/109 |
| 4,803,331 A | * | 2/1989 | Cohen | 219/110 |
| 5,126,528 A | * | 6/1992 | Bush et al. | 219/119 |
| 5,243,665 A | * | 9/1993 | Maney et al. | 219/110 |
| 5,380,978 A | * | 1/1995 | Pryor | 219/121.64 |
| 5,548,539 A | * | 8/1996 | Vlach et al. | 703/6 |
| 5,729,345 A | * | 3/1998 | Ludewig et al. | 356/394 |
| 5,852,273 A | * | 12/1998 | Ryudo et al. | 219/110 |
| 5,901,426 A | * | 5/1999 | Okazaki et al. | 29/407.08 |
| 5,917,726 A | * | 6/1999 | Pryor | 700/95 |
| 5,965,038 A | * | 10/1999 | Nomura et al. | 219/110 |
| 6,057,523 A | * | 5/2000 | Fujii et al. | 219/110 |
| 6,088,678 A | * | 7/2000 | Shannon | 219/119 |
| 6,132,108 A | * | 10/2000 | Kashiwamura et al. | 703/2 |
| 6,195,594 B1 | * | 2/2001 | Shah et al. | 219/110 |
| 2001/0028122 A1 | * | 10/2001 | Narushima et al. | 219/110 |
| 2002/0019726 A1 | * | 2/2002 | Crilly et al. | 703/1 |

FOREIGN PATENT DOCUMENTS

EP          0 359 585 A1     3/1990

OTHER PUBLICATIONS

Patent Abstracts of Japan—Pub # 09183031; Pub date: Jul. 15, 1997 Honda Motor Co Ltd.
Patent Abstracts of Japan; Pub # 2001071130 Pub Date: Mar. 21, 2001 Toyota Motor Corp.
XP 000944986 Finite Element Simulation and Measurement of Welding Residual Stresses.
XP 000451905—Three–Dimensional Finite Element Modeling of Gas Metal–Arc Welding.
Finite Element Analysis of Thermal Tensioning Tech. . . . , Welding Research Supp., 11/97.
Patent Application, "Method for Controlling Distortion of a Material During a Weld Process".
Welding–Induced Distortion Control Techniques in Large Structures, Y.P. Yang, et al.

* cited by examiner

*Primary Examiner*—Tom Dunn
*Assistant Examiner*—L. Edmondson
(74) *Attorney, Agent, or Firm*—Steve D. Lundquist; Robin S. Fahlberg

(57) ABSTRACT

A method for designing a weld fixture. The method includes modeling a set of distortions produced by applied mechanical forces on a material to be welded, modeling a set of distortions produced by applied thermal forces on the material to be welded, determining a set of reaction forces at a series of locations on a simulated weld fixture as a function of the modeled distortions, and designing a weld fixture as a function of the set of reaction forces.

11 Claims, 6 Drawing Sheets

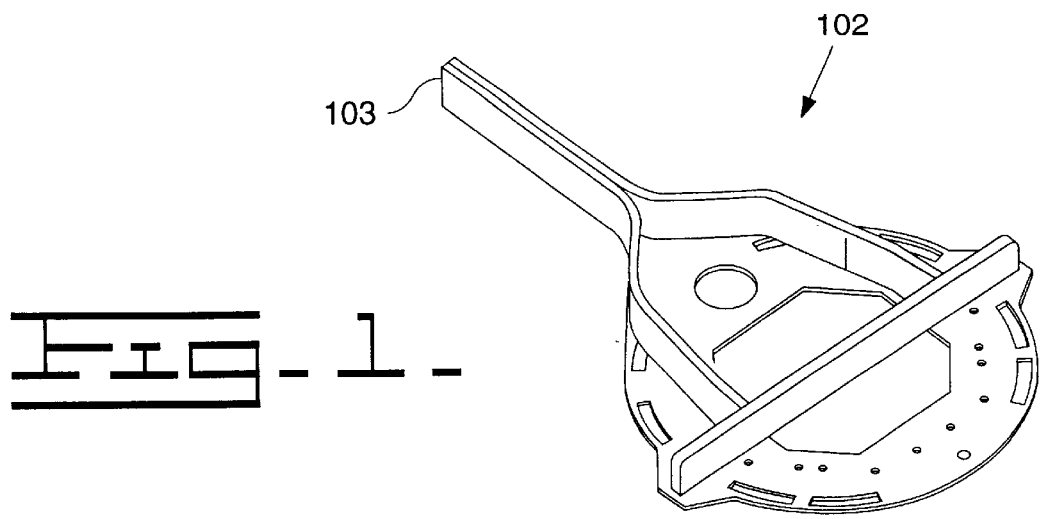
Fig-1-
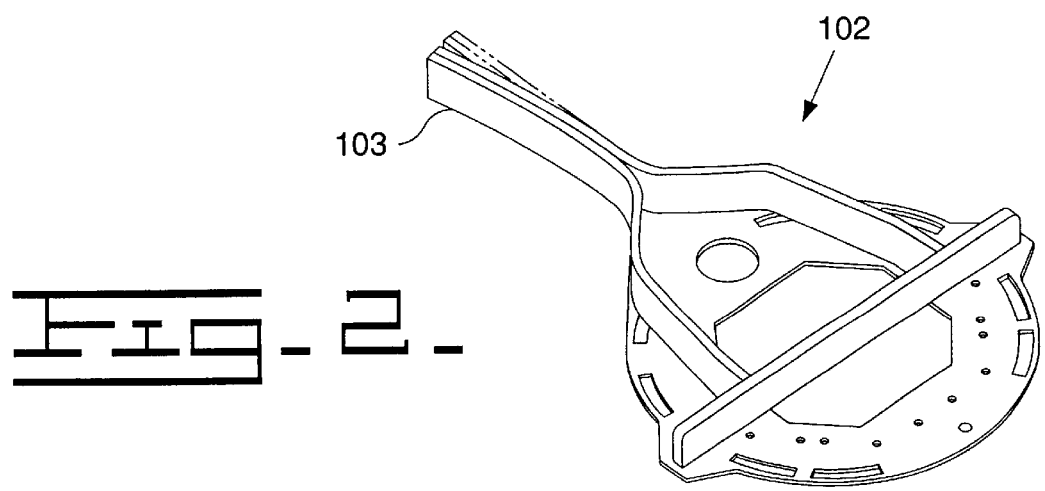
Fig-2-
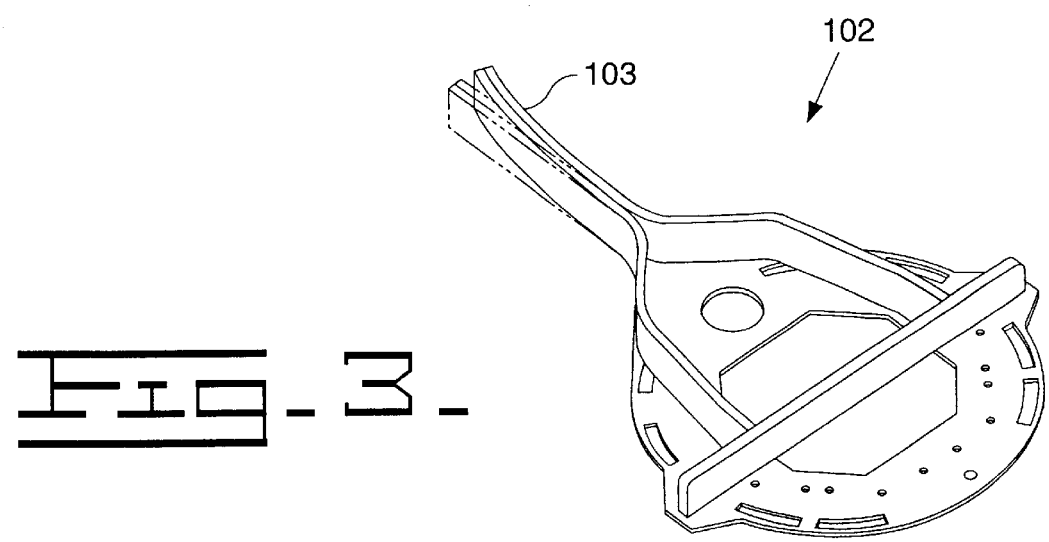
Fig-3-

Fig_4_
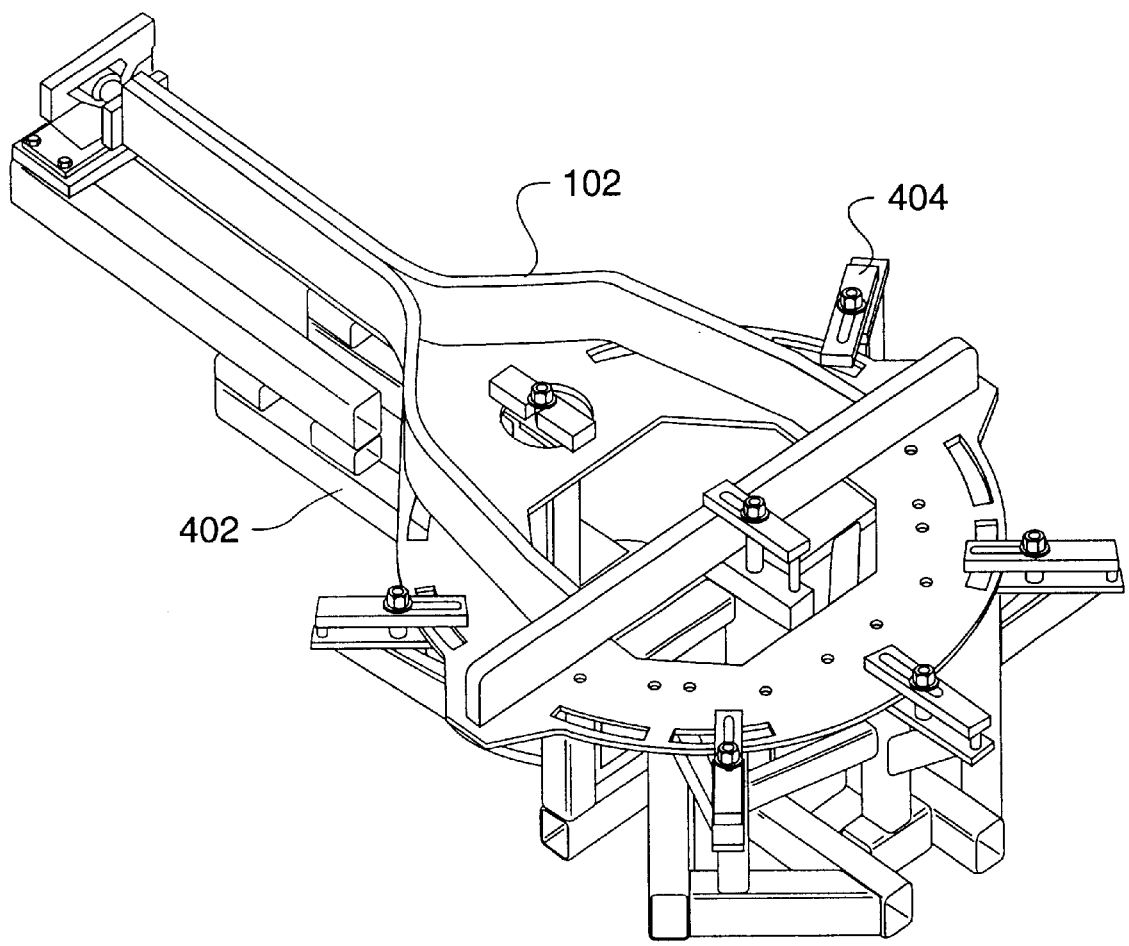

```
START
  ↓
MODEL WELD PROCESS OF         — 802
MATERIAL TO BE WELDED
  ↓
MODEL DISTORTIONS PRODUCED    — 804
BY APPLIED MECHANICAL FORCES
ON MATERIAL
  ↓
MODEL DISTORTIONS PRODUCED    — 806
BY APPLIED THERMAL FORCES
ON MATERIAL
  ↓
DETERMINE REACTION FORCES ON  — 808
SIMULATED WELD FIXTURE AS
FUNCTION OF MODELED DISTORTIONS
  ↓
DESIGN WELD FIXTURE AS        — 810
FUNCTION OF REACTION FORCES
  ↓
STOP
```

METHOD FOR DESIGNING A WELD FIXTURE BASED ON PREDICTED STRESSES AND DISTORTIONS

This application claims the benefit of Provisional application Ser. No. 60/278,824, filed Mar. 26, 2001.

TECHNICAL FIELD

This invention relates generally to a method for designing a fixture to hold a material to be welded during a weld process and, more particularly, to a method for modeling a simulated weld fixture to determine reaction forces produced by the weld process.

BACKGROUND

Welding a material is a common and well known procedure in a manufacturing process. The material being welded, typically a metal of some type, is altered by the weld process into a form that may be at least as strong as the original material to be welded. Many industries, e.g., manufacturers of mobile machines such as earthworking machines, transport machines, and the like, rely on welding as an integral part of the manufacturing process.

The welding process, however, creates undesirable side effects in the material to be welded. Distortions occur from the intense heat being used, and the resultant material may not maintain the desired shape when welding is completed.

Therefore, in the welding industry, it is common to employ techniques prior to the weld process which induce distortions in the material which are essentially the opposite as the distortions induced by the welding process. The intent of these induced distortions is to cause the material, during welding, to distort back to the original desired shape. For example, a technique known as pre-cambering, i.e., bending the material into a temporary distorted shape, is often used. Pre-cambering is accomplished by placing the material into a weld fixture, which holds the material in the desired distorted shape until welding is completed.

However, a weld fixture of this type must be designed to withstand reactive forces from the mechanical distortions induced on the material, and from thermal distortions produced by the weld process. These forces are of varying magnitude at different locations on the fixture, and the magnitude varies with time during welding. It is difficult to properly design a weld fixture to withstand these reactive forces at the proper locations on the fixture. Therefore, typical weld fixtures are either under-designed or over-designed. If a fixture is under-designed, the fixture will break during welding and a new fixture must be designed and built. This trial and error method is very costly. On the other hand, the fixture may be over-designed to avoid breakdown. This method, however, is also very costly since the fixture is built to much higher tolerances than needed.

The present invention is directed to overcoming one or more of the problems as set forth above.

SUMMARY OF THE INVENTION

In one aspect of the present invention a method for designing a weld fixture is disclosed. The method includes the steps of modeling a set of distortions produced by applied mechanical forces on a material to be welded, modeling a set of distortions produced by applied thermal forces on the material to be welded, determining a set of reaction forces at a series of locations on a simulated weld fixture as a function of the modeled distortions, and designing a weld fixture as a function of the set of reaction forces.

BRIEF DESCRIPTION OF THE DRAWINGS

FIG. 1 is a diagrammatic illustration of a material to be welded;

FIG. 2 is a diagrammatic illustration of the material of FIG. 1 including induced distortions;

FIG. 3 is a diagrammatic illustration of the material of FIG. 1 including weld distortions;

FIG. 4 is a diagrammatic illustration of the material of FIG. 1 clamped into a fixture;

DETAILED DESCRIPTION

Figure 5:
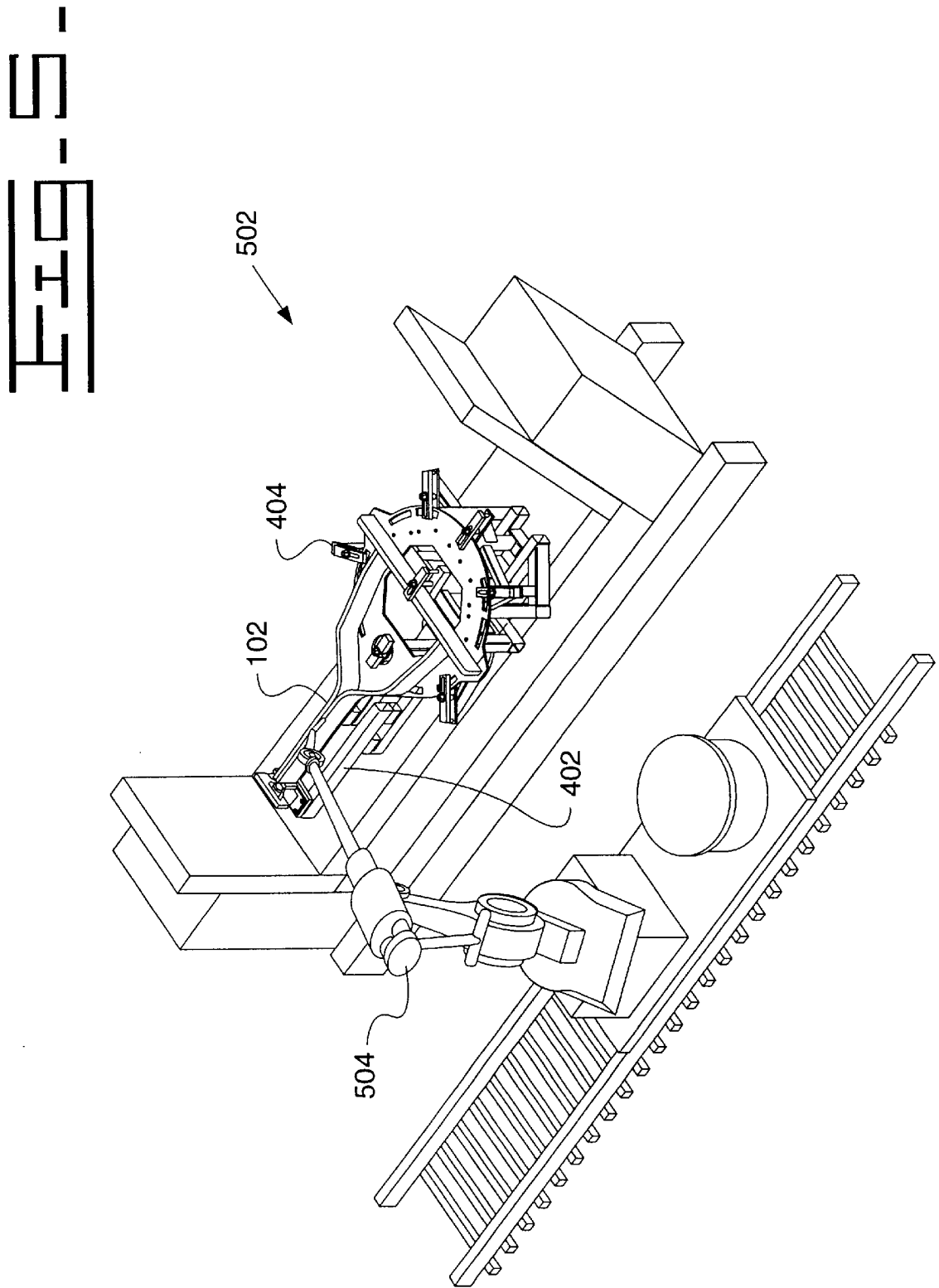
FIG. 5 is a diagrammatic illustration of a weld process on the material of FIG. 1.

Referring to the drawings, and with particular reference to FIGS. 1–3, a method for controlling distortion of a material 102 during a weld process is disclosed.

FIG. 1 illustrates a material 102 to be welded. The shape and features of the material 102 are for illustrative purposes only. The material 102 may be of any shape desired, and have any features desired. A protruding portion 103 of the material 102 is shown to illustrate with clarity distortions that occur with relation to the present invention. However, it is noted that many portions throughout the material 102 may be subjected to distortions during the weld process.

In FIG. 2, the protruding portion 103 is shown bent in a substantially leftward direction due to forces caused by induced distortions. Examples of induced distortions include, but are not limited to, pre-cambering distortions, i.e., bending the material into a temporary distorted shape, and pre-straining distortions, i.e., bending the material into a permanent distorted shape. Induced distortions, as they relate to the present invention, are discussed in more detail below.

In FIG. 3, the protruding portion 103 is shown bent in a substantially rightward direction due to forces caused by weld distortions. Historically, it is desired to introduce induced distortions, as exemplified in FIG. 2, for the purpose of counteracting the distortions caused by the welding process, as exemplified in FIG. 3, thus resulting in a finished welded material that approximates the original condition of FIG. 1 as closely as possible.

It is noted that the respective leftward and rightward directions of the induced and weld distortions are for purposes of illustration only. The distortions introduced during welding may cause the material to change shape and other properties in any of a multitude of ways.

Referring to FIG. 4, the material 102 is illustrated as being clamped into a pre-cambering fixture 402 by means of a plurality of clamps 404. For purposes of clarity, only one clamp 404 is identified by element number in FIG. 4. However, it is apparent that a number of clamps 404 are used at various positions to hold the material 102 into the pre-cambering fixture 402.

Pre-cambering is well known in the art and will not be discussed further except to note that the material 102 is clamped into the pre-cambering fixture 402 to induce temporary distortions in the material 102 until the welding process is completed. An alternate method of inducing distortions is pre-straining, which is also well known in the art and involves inducing permanent distortions by bending the material 102 in a desired manner so that the welding process causes the material 102 to distort back to a desired final configuration. Since the pre-straining process induces permanent distortions, a clamping fixture is generally not needed.

Referring to FIG. 5, the material 102 mounted in the pre-cambering fixture 402 is shown located at a robotic welding station 502. It is becoming increasingly more common to automate welding processes at manufacturing facilities. Advances in robotic technologies have made automated welding an economical, reliable, and desirable alternative to manual welding procedures.

A robotic welding arm 504 is free to move about the robotic welding station 502 in a controlled manner to perform the welding steps needed on the material 102. However, as discussed in more detail below, the clamps 404 which hold the material 102 in the pre-cambering fixture 402 must be positioned so that they do not interfere with the movement of the robotic welding arm 504 or the welding being performed by the arm 504. Furthermore, the overall configuration of the fixture 402 must be designed so that interference with the movement of the robotic welding arm 504 does not take place.

Figure 6:
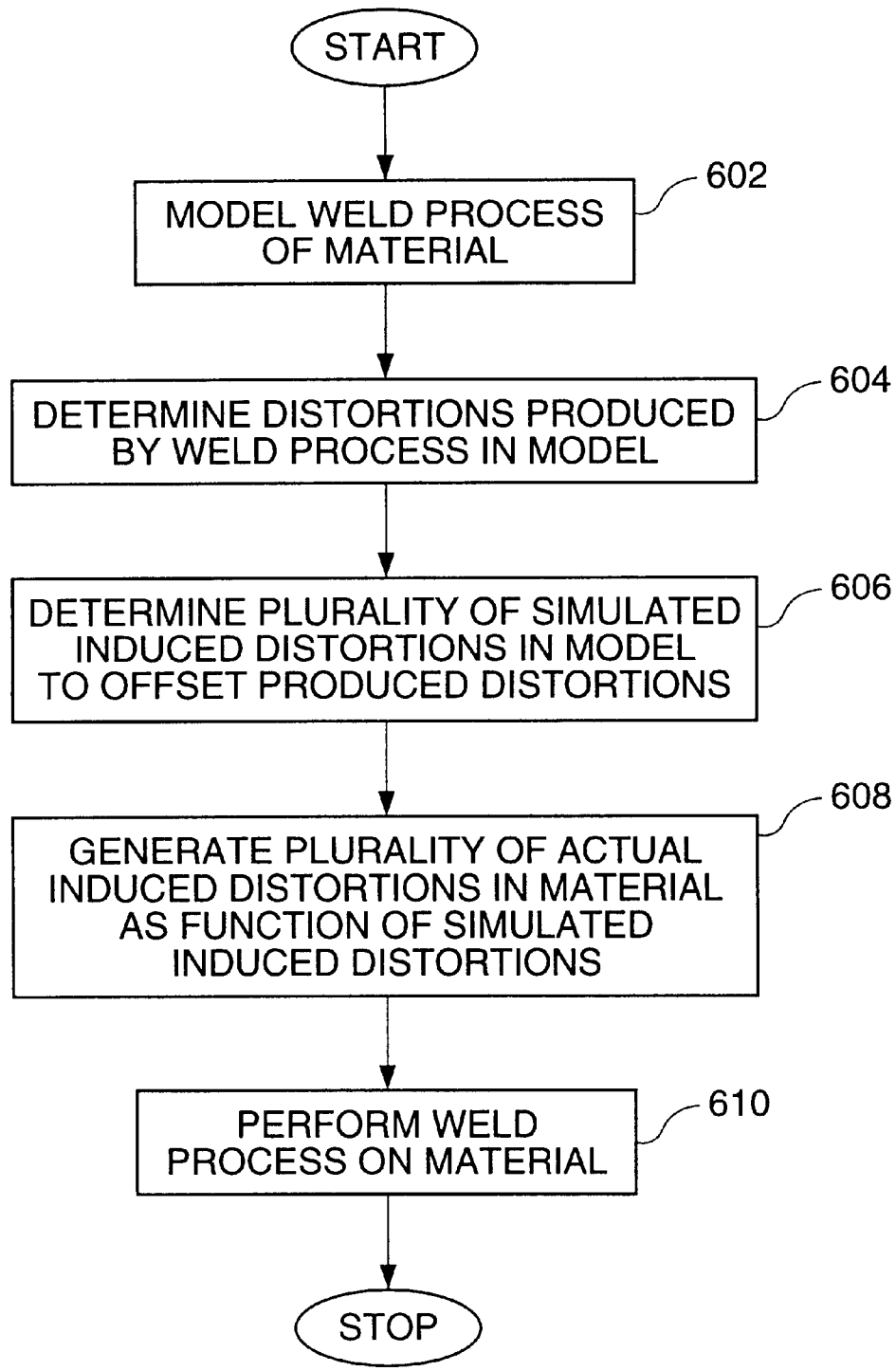
FIG. 6 is a flow diagram illustrating a preferred method for modeling a weld process of a material.

Referring to FIG. 6, a flow diagram illustrating a preferred method for modeling a weld process on a material is shown. The preferred method, as depicted in FIG. 6, is designed to model the distortions induced prior to welding and during welding in a simulation environment before any actual welding takes place. The simulation of the distortions provides a means to determine the desired distortions to induce which would result in the final welded material 102 to have the desired shape and characteristics. The steps shown in FIG. 6, therefore, are designed to eliminate the previous trial and error methods of determining the amount of induced distortions to use.

In a first control block 602, the weld process of the material 102 is modeled. This model takes into account characteristics and dimensions of the material 102, as well as other characteristics such as the type of welding procedure, the temperatures introduced, the duration of the heat produced, and such.

In a second control block 604, the distortions produced by the weld process on the material 102 are determined. Preferably, the distortions are determined by finite element analysis of the material 102 during welding. Finite element analysis techniques of a weld process are well known in the art and will not be discussed further. However, the distortions may alternatively be determined by any of a number of other analytical or numerical analysis techniques.

In a third control block 606, a plurality of simulated induced distortions are determined in the model which would offset the distortions introduced by the above described simulated weld process. In the preferred embodiment, the finite element analysis approach is used to determine the induced distortions at a plurality of finite element locations to achieve an overall model of the induced distortions needed. Alternatively, an analytical or some other numerical analysis approach may be used to determine the induced distortions.

In a fourth control block 608, the simulated induced distortions are used as a model to generate a plurality of actual induced distortions in the material 102. Preferably, if pre-cambering techniques are used, the material 102 is clamped into the pre-cambering fixture 402 at desired clamp locations to hold the material 102 in the desired distorted position until welding is completed. Alternatively, if pre-straining techniques are used, the material 102 is bent permanently into the desired distorted shape in preparation for the welding process. This bending may be accomplished using standard well known techniques, such as stamping, bending, hammering, and the like.

In a fifth control block 610, the actual weld process on the material 102 is performed. Preferably, the distortions introduced by welding counteract the induced distortions, and the final outcome of the material 102 is such that the desired finished shape is restored, thus minimizing any distortions from the welding process.

Figure 7:
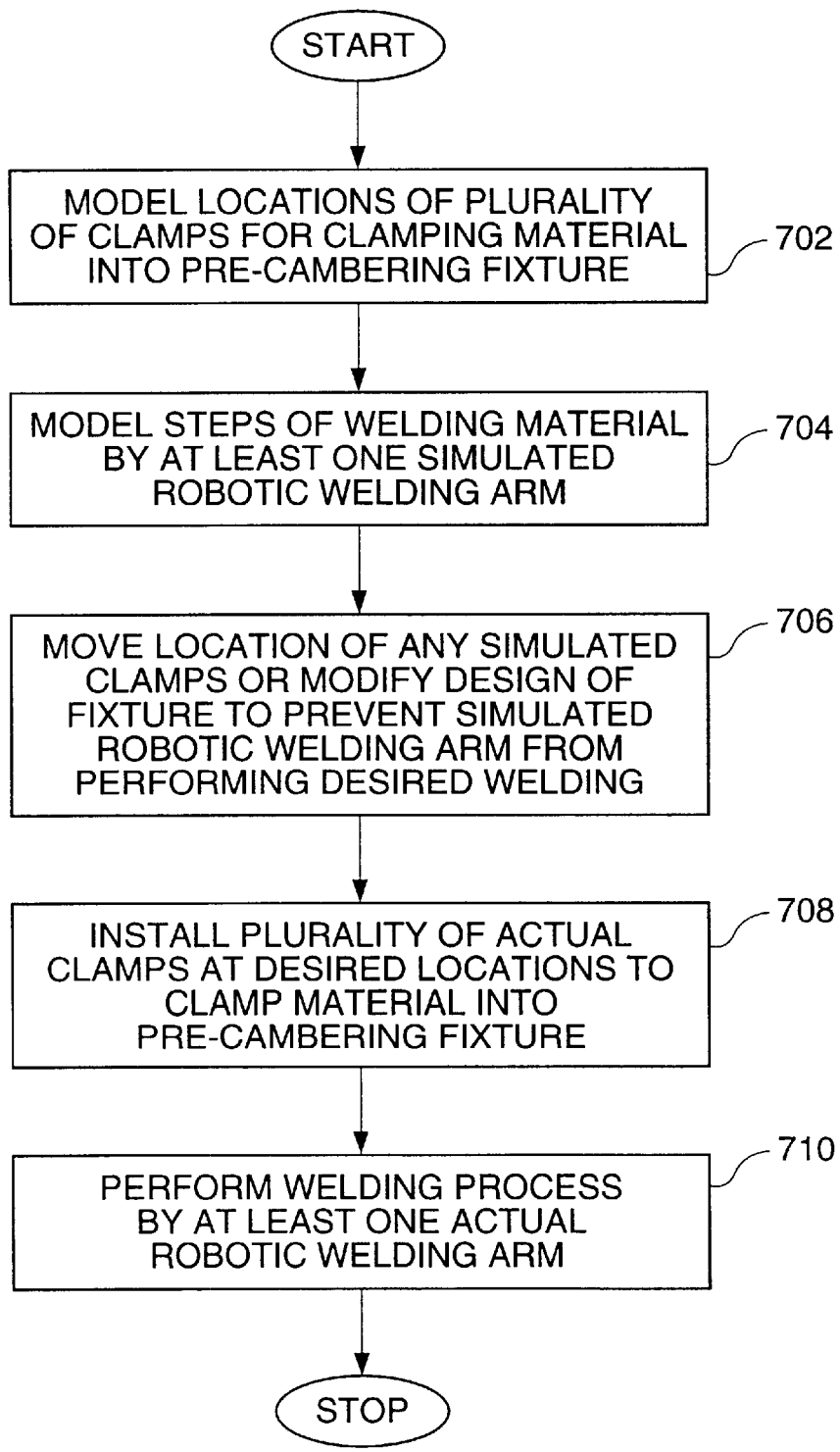
FIG. 7 is a flow diagram illustrating another aspect of a preferred method for modeling a weld process of a material.

Referring to FIG. 7, an alternate embodiment of the method of FIG. 6 is illustrated in a flow diagram. The embodiment of FIG. 7 typically applies when pre-cambering distortions are used, and is designed to eliminate interference during an automated weld process.

In a first control block 702, the locations of the plurality of clamps 40 are modeled as a function of the determined desired pre-cambering induced distortions from the model described with respect to FIG. 6.

In a second control block 704, the steps needed to perform the welding operation are modeled using a simulation of at least one robotic welding arm 504. More specifically, the desired movements of the robotic welding arm 504 to perform the welding operation are simulated.

In a third control block 706, a determination is made if any of the modeled clamps 404 would interfere with the movement of the robotic welding arm 504 or with the welding process performed by the robotic welding arm 504. Any clamps 404 which would interfere must be moved to a new location without modifying the desired induced distortions. In addition, the configuration of the pre-cambering fixture 402 is analyzed to determine any potential interference between the robotic welding arm 504 and the fixture 402. For example, the pre-cambering fixture 402 would include a plurality of locations (not shown) which would provide support against the material 102 as the clamps 404 are applied. These support locations must not be allowed to interfere with the movement and operation of the robotic welding arm 504. Alternatively, the movement and operation of the robotic welding arm 504 may be altered to eliminate the interference.

In a fourth control block 708, a plurality of actual clamps 404 are installed at the desired locations to clamp the material 102 into the pre-cambering fixture 402 to induce the desired pre-cambering distortions without providing interference to the robotic welding arm 504.

In a fifth control block 710, the actual welding process is performed on the material 102 by at least one actual robotic welding arm 504. It is noted that the typical welding process in a manufacturing environment is repetitive, so that the above modeling and simulation steps only need be performed once for mass production of the welded material 102, until any changes are made, such as changes in the shape, dimensions, or characteristics of the material 102 to be welded, or changes in the welding process itself.

Figure 8:
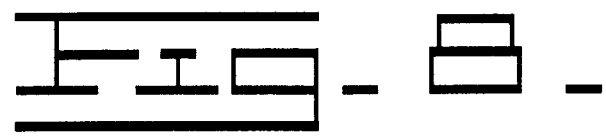
FIG. 8 is a flow diagram illustrating a preferred method of the present invention.

Referring to FIG. 8, a flow diagram illustrating a preferred method of the present invention is shown. The present invention extends the modeling of the weld process as described above to include modeling of the forces, mechanical and thermal, being applied to the pre-cambering fixture 402, hereinafter referred to as the weld fixture 402. Modeling of the reaction forces of the weld fixture 402 to these applied forces is also part of the present invention.

In a first control block 802, the weld process of the material 102 is modeled, as is described in detail above. Preferably, the weld process includes welding a material 102 which is clamped into a weld fixture 402.

In a second control block 804, a set of distortions produced by applied mechanical forces on the material 102 is modeled. The mechanical distortions are produced by the mechanical forces applied by the weld fixture 402 during pre-cambering of the material 102. It is noted that the weld fixture 402 may also be used to hold two or more pieces of material 102 together during the weld process to weld the pieces into one unit. In this situation, mechanical forces may be applied to hold the pieces together in a desired manner, and pre-cambering may or may not be used in addition.

In a third control block 806, a set of distortions produced by applied thermal forces on the material 102 is modeled. Preferably, the thermal forces are produced by heat generated during the weld process. The heat generated causes the material 102 to bend and distort, thus applying forces against the weld fixture 402.

In the preferred embodiment, the modeled thermal distortions are coupled to the modeled mechanical distortions during the weld process to determine resultant forces from both sources of distortions.

In a fourth control block 808, a set of reaction forces at a series of locations on the weld fixture 402 is determined as a function of the modeled distortions. A reaction force is the force applied by the weld fixture 402 equal and opposite to a force applied to the weld fixture 402 by the mechanical and thermal distortions. Preferably, the reaction forces will vary over different locations of the weld fixture 402, and will also vary over time. In the preferred embodiment, a set of maximum reaction forces are determined at a series of locations on the weld fixture 402. For example, at each desired location of the weld fixture 402, a maximum reaction force is determined over a period of time during which the simulated weld process takes place.

The set of maximum reaction forces obtained by the step described in the fourth control block 808 provides the information needed to design the weld fixture 402 to the required strength at each desired location of the weld fixture 402, as shown in a fifth control block 810. For example, some portions of the weld fixture 402 will require higher strength characteristics than other portions since the forces produced at those higher strength portions are determined to be greater in the model. Furthermore, the set of maximum reaction forces may indicate that some design parameters must be reconfigured. For example, a different shape, different material compositions, or a different placement of clamps 404.

INDUSTRIAL APPLICABILITY

Weld fixtures have typically been designed from empirical data, past experience, and trial-and-error techniques. Historically, once a weld fixture was designed, it would be tested by using it in the desired application. If the weld fixture broke, a new fixture would be constructed to more stringent design specifications. Since many of the larger weld fixtures might cost several thousand dollars to build, the historical trial-and-error method of designing and building weld fixtures is very costly.

The present invention offers the advantage of determining the minimal design criteria to use for a fixture that would adequately perform the task. Furthermore, the present invention provides the advantage of determining the minimal design criteria for specific locations of the desired fixture, thus avoiding the costly waste associated with designing and building the entire fixture to one maximum standard.

Other aspects, objects, and features of the present invention can be obtained from a study of the drawings, the disclosure, and the appended claims.

What is claimed is:

1. A method for designing a weld fixture, including the steps of:
   modeling a set of distortions produced by applied mechanical forces on a material to be welded;
   modeling a set of further distortions produced by applied thermal forces on the material to be welded;
   determining a set of maximum reaction forces at a series of locations on a simulated weld fixture as a function of the modeled distortions; and
   designing a weld fixture as a function of the set of maximum reaction forces.

2. A method, as set forth in claim 1, wherein the applied mechanical forces include forces produced by pre-cambering distortions on the material to be welded.

3. A method, as set forth in claim 2, wherein pre-cambering distortions include distortions induced by bending the material to be welded into a temporary distorted shape.

4. A method, as set forth in claim 1, wherein the applied thermal forces include forces produced by heat generated during a weld process.

5. A method, as set forth in claim 1, wherein determining a set of maximum reaction forces at a series of locations on a simulated weld fixture includes the step of determining a maximum reaction force for each desired location over a period of time.

6. A method, as set forth in claim 5, wherein a period of time includes a duration of a simulated weld process of the material to be welded.

7. A method for designing a fixture to hold a material to be welded during a weld process, including the steps of:
   modeling a set of distortions produced by pre-cambering of the material to be welded;
   modeling a further set of distortions produced by thermal forces on the material during the weld process;
   determining a set of maximum reaction forces at a series of locations on a simulated weld fixture as a function of the modeled distortions; and
   designing a weld fixture as a function of the set of maximum reaction forces.

8. A method for designing a fixture to hold a material to be welded during a weld process, including the steps of:
   modeling the weld process of the material to be welded;
   determining a set of distortions produced by the weld process in the model;
   determining a set of reaction forces to the distortions at a plurality of locations on a simulated weld fixture; and
   responsively designing a weld fixture as a function of maximum values of the reaction forces.

9. A method, as set forth in claim 8, wherein the set of distortions include mechanical distortions produced by pre-cambering of the material to be welded.

10. A method, as set forth in claim 9, wherein the set of distortions further include thermal distortions produced by the weld process.

11. A method, as set forth in claim 10, wherein the modeled thermal distortions are coupled to the modeled mechanical distortions during the modeled weld process.

* * * * *